Feb. 5, 1935. F. GRAY 1,990,182
ELECTROOPTICAL SYSTEM
Filed Aug. 26, 1930
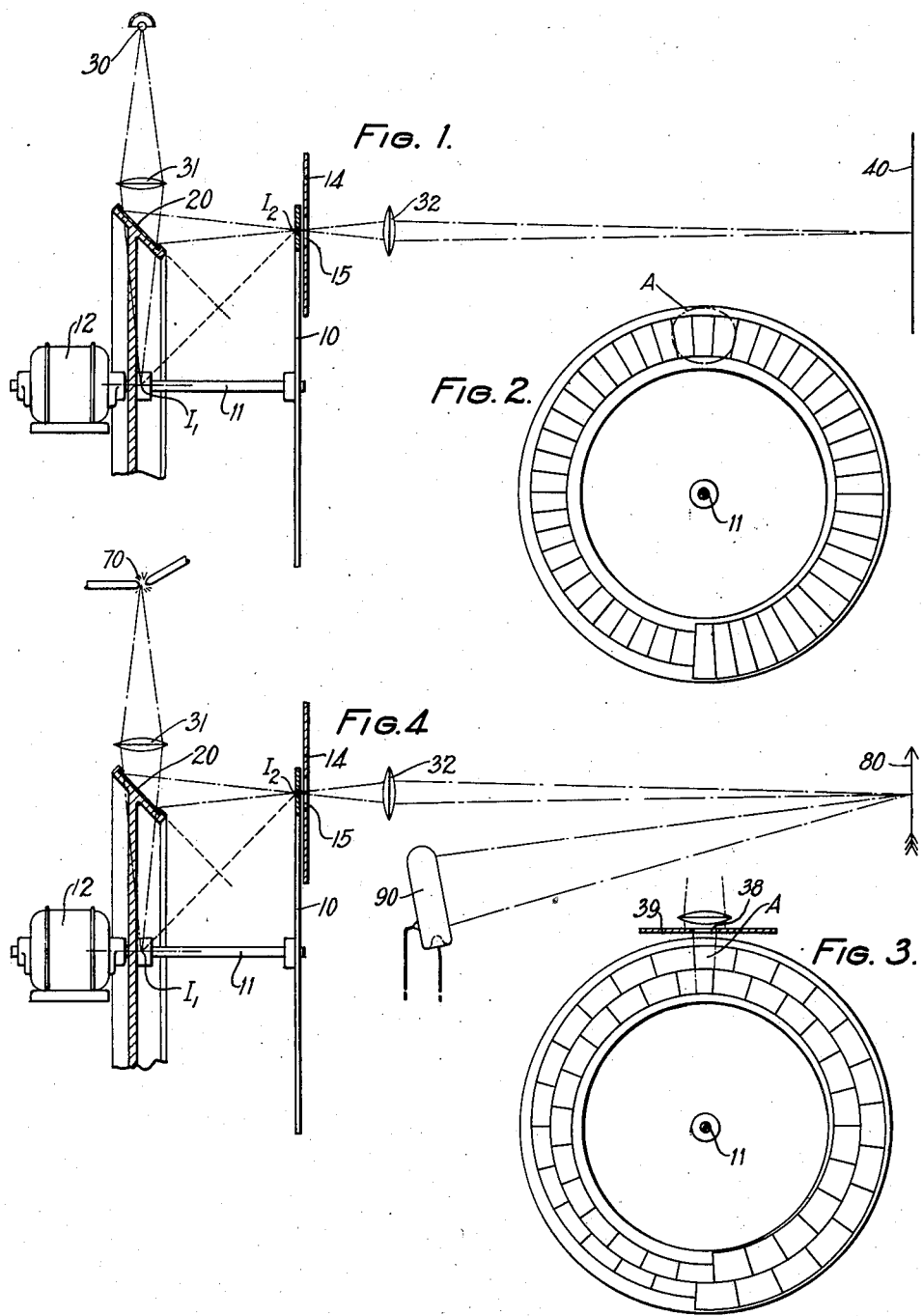
INVENTOR
F. GRAY
BY C. A. Sprague.
ATTORNEY Patented Feb. 5, 1935

1,990,182

UNITED STATES PATENT OFFICE 1,990,182

ELECTROOPTICAL SYSTEM

Frank Gray, New York, N. Y., assignor to Bell Telephone Laboratories, Incorporated, New York, N. Y., a corporation of New York Application August 26, 1930, Serial No. 477,851

5 Claims. (Cl. 178—6)

This invention relates to electro-optical systems and more particularly to a method and means of scanning.

An object of this invention is to more efficiently use the light in an electro-optical scanning system. The light element is of small size whether a light source or a light sensitive cell, and the scanning beam either originates or terminates in this element for reception or transmission, respectively.

Other objects and advantages will appear from a consideration of the specification and accompanying drawing.

In this invention line series of elemental areas of a field of view are scanned by a novel movement of one or more beams of light over the field. Considering a single scanning beam, it is focused at the position of the active moving scanning aperture and moved therewith as each aperture passes in succession the field of view and at all times the direction of the scanning beam is such that its axis passes through the center of a small fixed light source or a light sensitive element. A fixed lens system positioned between the light element and the scanning member together with a light directing conical spiral polyhedral mirror system moving with the scanning member is employed to cause the light beam to converge and pivot on the light element at one end of its path and to converge on and move with the active aperture passing the scanning field thereby transmitting a maximum amount of light through the scanning aperture. A simple arrangement of the moving element consists of an apertured scanning disc having a mirror behind each aperture positioned at a suitable distance and at a certain angle, such as about 45° in a given set-up, and all rotated together. The relationship of the light directing elements is such that the virtual image of each aperture while passing the scanning field is in the axis of rotation of the scanning disc.

This scanning arrangement is applicable for either flood or spot lighting electro-optical transmission, and for reception, in all of which either the light sensitive element or the light source may be small and of the so-called "point" type.

In other television systems scanning line series of elemental areas of a field of view, only a very small portion of the light source is employed at any instant, one of the usual arrangements being to use the photo-electric signal current to light a large area at least equal to the entire field of view at the scanning member, while only one elemental area of the light source is used at any instant, which results in the utilization of a small fraction of 1% of the light produced. In such an arrangement for an image scanned in 2500 elemental areas less than 1/2500 of the light generated by the received signal current is used and moreover as the number of elemental areas into which the image is divided is increased the use of the light generated is decreased proportionally. In this invention the signal current is employed to produce a small intense light and the optical system is arranged at all times to focus the light from this source upon the apertures as they pass the viewing field, thereby greatly increasing the effectiveness of the light produced, or for a given illumination of the field of view permitting a very much weaker signal current than is possible with the alternative system above mentioned. For certain types of point sources the effectiveness of the light generated by the signal current may be made substantially independent of the number of elemental areas into which the image may be divided in scanning.

A more detailed description of the embodiment of the invention chosen for illustration follows and is illustrated in the accompanying drawing:

Fig. 1 is a diagrammatic view showing the general arrangement of the television scanning system applicable either for transmitting or receiving;

Fig. 2 is a front view of the light directing polyhedral mirror system showing one arrangement of the mirrors;

Fig. 3 is a front view of a composite light directing polyhedral mirror system showing a modified arrangement of the mirrors; and Fig. 4 is a diagrammatic view showing the general arrangement of the television scanning system as arranged for generating photoelectric current by spot scanning illumination for transmitting.

Similar reference characters refer to similar parts of the apparatus.

Referring to Fig. 1 disclosing a scanning arrangement applicable to the television transmission of images of objects illuminated by flood lighting or to the reception of television images, the apertured scanning disc 10 is mounted on a shaft 11 carrying the light directing polyhedral mirror system 20, all mounted so as to form a unitary rotating structure. This is rotated by any suitable means, such as the motor 12. Considering this scanning arrangement for producing an image of an object transmitted by photoelectric currents, the point light source 30 is controlled by the incoming signal current. A suitable reflector may be used with the light source. Light from the source 30 is directed by the lens 31 on the mirrors in the polyhedral mirror system 20 and made to converge on an aperture in the scanning disc 10 as it passes the scanning field. The light after passing through such an active scanning aperture is directed by a suitable lens system 32 upon a screen 40 where line series of elemental areas are illuminated on the screen setting up an image having light tone values in accordance with the variations of the photo-electric current impressed upon the light source 30.

In a modified arrangement the image may be directly viewed as it is produced in the scanning field at the surface of the scanning disc by removing the lens 32 and placing the eye within the small solid angle subtended by the light passing through the scanning apertures. When so viewed the image would appear the same size as the scanning field and the position of the eye of the observer would be quite definitely located, while if the lens system 32 and the screen 40 are used, a larger image may be produced which may be seen from different positions and by a number of observers simultaneously. If the screen 40 is ground glass or the equivalent the image may be viewed from the far side.

The apertures in the scanning disc 10 are equally spaced and spirally positioned in the arrangement shown in the drawing. The polyhedral mirror system 20 consists of a plurality of plane mirrors one for each aperture, as shown more clearly in Fig. 2. The mirrors are arranged somewhat in the form of a truncated cone, each mirror being suitably fixed upon the periphery of a disc or wheel mounted upon the same shaft as the scanning disc.

The distance of the centre of each mirror from the scanning disc or the aperture with which it is associated is approximately equal to the radial distance the aperture is away from the axis of rotation of the scanning disc, while the distance the center of each mirror is away from the axis of rotation of the scanning disc is approximately the same as the radial distance of the apertures. The fixed lens 31 is so arranged that light from the source 30 would be brought to a focus, if the mirrors did not intervene, at a point $I_1$ in the axis of rotation of the scanning disc, but as the mirrors are positioned in the path of the light beam, its direction is changed and the image of the light source 30 is formed in the plane of the scanning disc at the position of the apertures $I_2$. The theoretical positions of the images $I_1$ and $I_2$ are on a line perpendicular to the plane of the mirror, as shown by the dotted lines in the drawing, and if the optical system is so arranged that the position of the image $I_1$ falls in the axis of rotation of the scanning disc and the position of the image $I_2$ falls on a scanning aperture, the best working arrangement is obtained. This arrangement may be more clearly seen by reversing the optical system and considering the source of light at $I_2$, since when an optical system forms an image of a source, the paths of all of the rays are the same as they would be if reversed in direction, that is, if the image were replaced by a source an image would be formed in the exact position of the previous source. Therefore, light coming from a source positioned at an aperture at $I_2$ after reflection from a mirror in the polyhedral mirror system 20 behaves as if it came from the position of the virtual image $I_1$ located on a perpendicular from the source $I_2$ to the extended plane of the mirror and as far behind the mirror as the source is in front of the mirror. The mirror rotating with the scanning disc carries the light brought to a focus at the surface of the scanning disc along with the aperture upon which it is focused. With this arrangement, the scanning disc might even be omitted as the focal position of the beam would be in the position of a scanning aperture, but from a practical and commercial standpoint, the use of the scanning disc requires less accuracy in the construction of the optical system and thus materially decreases the cost of construction. The scanning disc, however, cuts off any leakage light reflected or diffused towards the field of view circumscribed by the opening 15 and thus has this further advantage. The screen 14 having the aperture 15 bounding the field of view obstructs the passage of light to the viewing position from all but one aperture at a time if the system is operated as a single channel system and only from such a plurality of apertures as should be simultaneously operating if the system is operated as a multiple channel system.

Fig. 2 shows a front view of the polyhedral mirror system. The area A on the mirrors illuminated by the light source 30 preferably subtends two mirrors, so that as each aperture passes beyond the viewing field and another simultaneously comes into the viewing field both are lighted. An apertured opaque screen might be positioned in the path of the light to define the shape and size of the lighted area A or the lens system 31 might be specially designed to do this. While having the light from the light source illuminate more than one aperture at a time divides the light energy, it has the decided advantage of not wasting transmission line time by rendering the mirror ineffective part of the time which might be the case if the light were entirely concentrated on an aperture as it passes the viewing field and were passed to a second mirror with some loss of time between changes from one aperture to another.

In mounting the mirrors of the polyhedral system 20 a number of arrangements may be followed in carrying out the optical line up which in general substantially follows the fundamental principles of this invention. For example, the center of all mirrors might be in either a circle or a spiral, or the center of the outer or the inner edge of each mirror might be positioned in a circle or a spiral. In any case the different mirrors behind the disc will be so positioned and inclined that the virtual images of all of the apertures fall at approximately the same point upon the axis of rotation of the scanning system. In practice, when the source 30 and the lens 31 are located as far behind the disc as the radius of the spiral of aperture, such adjustments could be made by adjusting each mirror so that an image of the source falls on its respective aperture.

The positioning and adjustment of the mirrors may be somewhat simplified by having the optical set-up the same for each aperture which results, if the apertures in the scanning disc are positioned in a circle rather than in a spiral as above described. The spiral positioning provides for both the transverse and the longitudinal movement of the scanning light beam while the circular arrangement provides for only the transverse movement. With the apertures positioned in a circle the longitudinal or second movement of the scanning beam may be obtained, for example, by placing light deflecting elements such as mirrors or prisms having different angles on each aperture, or by using a slowly rotating disc of lenses in front of the apertured disc. In this arrangement the radial distance of each aperture from the axis of rotation of the scanning disc is the same and the distance the center of each mirror is away from the scanning disc and away from the axis of rotation may be the same and equal to the radial distance of the apertures from their axis of rotation and the angle between each mirror and the axis of rotation is the same for all, which results in making the optical set-up somewhat simpler than with a spiral positioning of the apertures which are at various radial distances from their axis of rotation.

Fig. 3 shows a polyhedral mirror system made up of two sets of polyhedral mirrors. The mirrors of the two sets are symmetrically angularly displaced with reference to each other. One mirror completely enters the field of the light beam before the preceding mirror leaves it. At this moment both the aperture entering and the aperture leaving the scanning field are receiving their full light beam, and the aperture entering continues to receive its full share of the light during its passage across the scanning field. The illuminated area A radially embraces the two sets of polyhedral mirrors and angularly one-half the angular length of a mirror. An aperture 38 in an opaque screen 39 may be employed to define the area of the beam of light directed on the polyhedral mirror system.

Obviously, various other modifications of the polyhedral mirror system may be made in conformity with the general principles of this invention. The truncated polyhedral mirror system might even be completely reversed so that the wider opening would face the scanning disc and the light source and the converging lens 31 placed within the polyhedral mirror system. In this case the light source would be a strip light positioned parallel with the scanning movement and the length of the strip source of light would be somewhat proportional to the distance it is away from the axis of rotation of the scanning element. In this arrangement a spot source of light could be used if the lens associated with it were a cylindrical lens or the light positioned at the axis of rotation of the polyhedral mirror system.

Fig. 4 shows the scanning arrangement especially adapted for spot scanning and generating photoelectric currents, the scanning apparatus being similar to that shown in Fig. 1. The source of intense light 70, however, is of substantially uniform intensity. The object 80 which is scanned by rapidly moving a spot of intense light over its surface successively reflects light from each elemental area over a wide angle to one or more large light sensitive cells 90 in which photoelectric currents are generated. The object 80 may be of a transparency such as a film and the light sensitive element would then cover and be placed on the far side where transmitted light would impinge upon it. As the scanning mechanism is substantially the same as that shown in Fig. 1, further description here is unnecessary.

This system may also be used to record television images on moving film. The arrangement shown in Fig. 1 is readily adaptable to this purpose. The apertures in the scanning disc would be arranged in a circle and the film would be moved continuously across the path of the scanning light beam in front of the lens 32 at the proper distance to illuminate at any instant an elemental area of the film. A rapidly rotating scanning disc with a relatively small number of apertures may be used.

The term rotatable conical polyhedral mirror as used herein is intended to define a structure comprising a large number of mirror facets lying about a common axis of rotation and being generally inclined toward said axis, said facets having corresponding points respectively lying in a circle or spiral, whereby said assembly of mirror facets bear a general resemblance to a portion of a conical surface.

What is claimed is:

1. In combination in a light channel, an apertured scanning disc, a rotating conical polyhedral mirror system having the same axis of rotation as said disc and having a plurality of light deflecting plane faces corresponding to the number of apertures in said disc and each positioned from its respective aperture a distance approximately equal to the distance of the aperture from the axis of rotation, a small fixed light source, and a fixed lens system positioned between said light source and the said scanning disc.

2. An electro-optical scanning system comprising a rotatable apertured disc, mirrors associated with said apertures respectively in fixed relation thereto, each mirror being so positioned with respect to its aperture that it forms on the axis of rotation a virtual image of that aperture.

3. In combination in a light channel, an apertured scanning disc, a rotating conical polyhedral mirror system having the same axis of rotation as said disc and having a plurality of light deflecting plane faces corresponding to the number of apertures in said disc and each positioned from its respective aperture a distance approximately equal to the distance of the aperture from the axis of rotation, a small fixed light source, a fixed lens system positioned between said light source and the said scanning disc, and a fixed lens system positioned beyond said scanning disc for causing the scanning rays to converge and come to a focus approximately in a plane beyond said last mentioned fixed lens system.

4. In combination in a light channel, an apertured scanning disc, a rotating conical polyhedral mirror system having the same axis of rotation as said disc and having a plurality of light deflecting plane faces corresponding to the number of apertures in said disc and each positioned from its respective aperture a distance approximately equal to the distance of the aperture from the axis of rotation, a small fixed light source, a fixed lens system positioned between said light source and the said scanning disc, a fixed lens system positioned beyond said scanning disc for causing the scanning rays to converge upon an object beyond said last mentioned fixed lens system, and a light sensitive element for generating photoelectric currents positioned to receive light reflected from the object scanned.

5. In combination in a light channel, an apertured scanning disc, a rotating conical polyhedral mirror system having the same axis of rotation as said disc and having a plurality of light deflecting plane faces corresponding to the number of apertures in said disc and each positioned from its respective aperture a distance approximately equal to the distance of the aperture from the axis of rotation, a small fixed light source and a fixed image forming means positioned between said light source and said scanning disc for forming a real image of said light source on said scanning disc.

FRANK GRAY.